May 1, 1951  J. MULLER  2,550,850
VARIABLE INCIDENCE MULTIPLE WING SYSTEM FOR AIRCRAFT
Filed May 10, 1943  8 Sheets-Sheet 1

INVENTOR.
JAQUES MULLER
BY
Bohleber, Fassett Montstream
ATTORNEYS

May 1, 1951 J. MULLER 2,550,850
VARIABLE INCIDENCE MULTIPLE WING SYSTEM FOR AIRCRAFT
Filed May 10, 1943 8 Sheets-Sheet 2

INVENTOR.
JAQUES MULLER
BY
Bohleber, Jassett & Montstream
ATTORNEYS

INVENTOR.
JAQUES MULLER

May 1, 1951 J. MULLER 2,550,850
VARIABLE INCIDENCE MULTIPLE WING SYSTEM FOR AIRCRAFT
Filed May 10, 1943 8 Sheets-Sheet 4

INVENTOR.
JAQUES MULLER
BY
ATTORNEYS

May 1, 1951 J. MULLER 2,550,850
VARIABLE INCIDENCE MULTIPLE WING SYSTEM FOR AIRCRAFT
Filed May 10, 1943 8 Sheets-Sheet 5
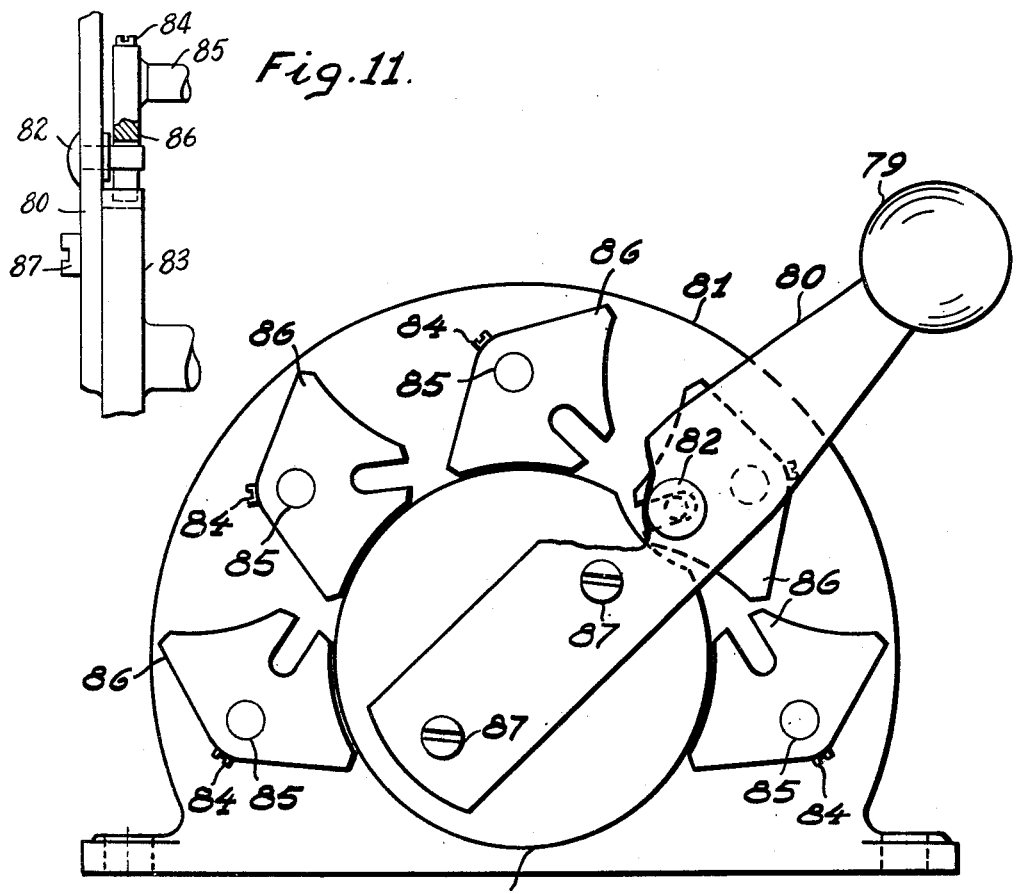
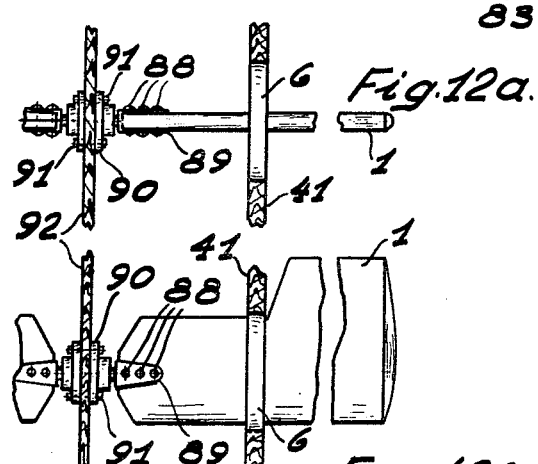
INVENTOR.
JAQUES MULLER
BY
Bohleber, Jassett & Montstream
ATTORNEYS

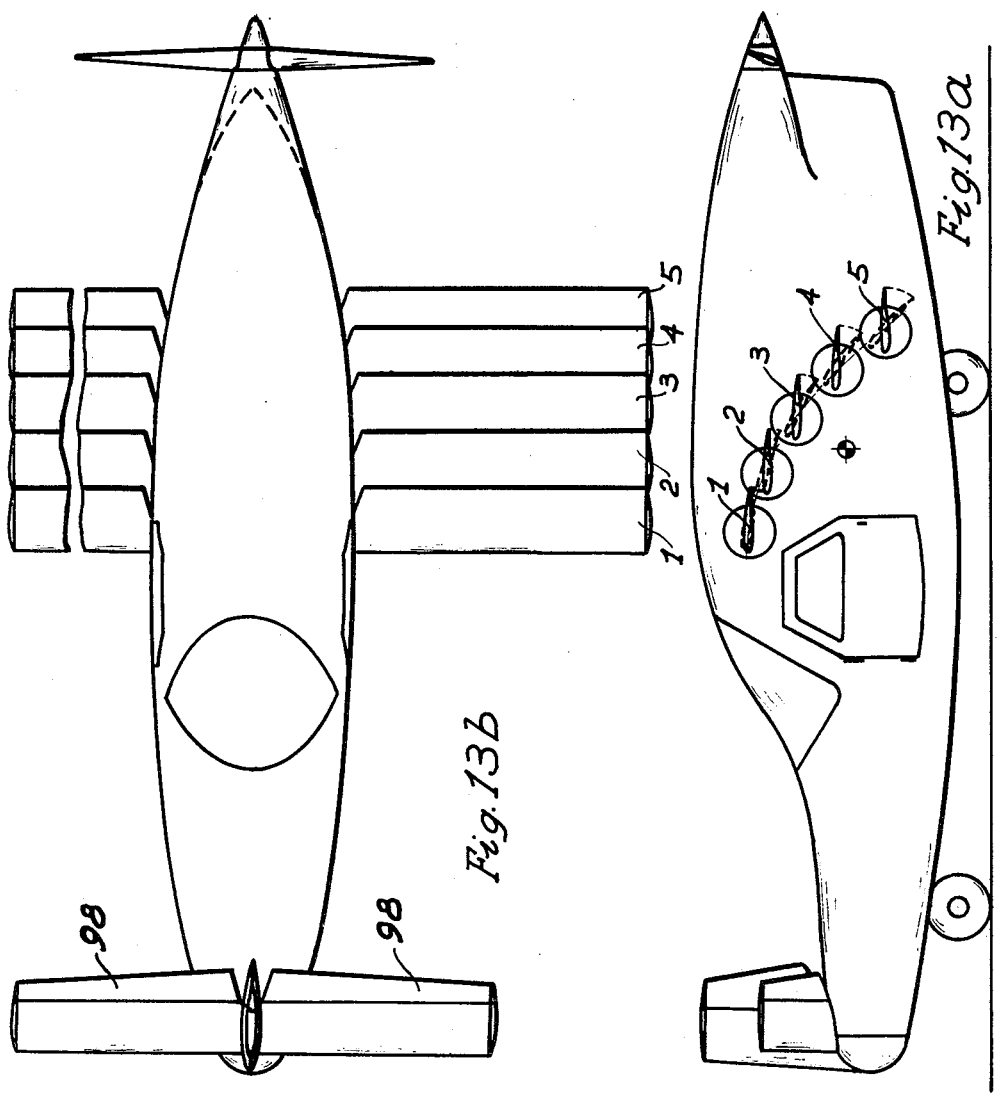

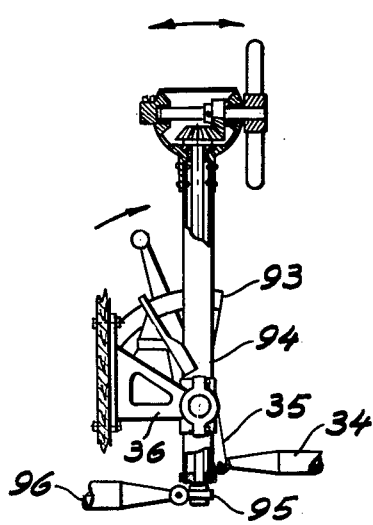
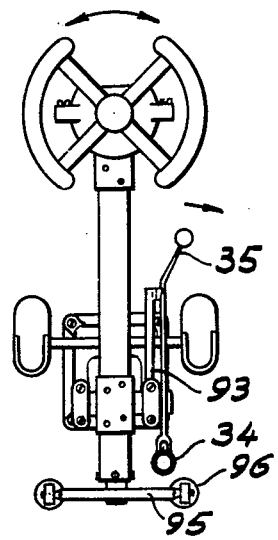
Fig.14b  Fig.14a
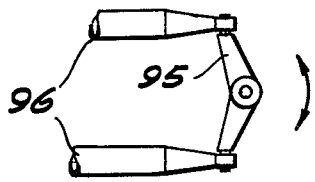
Fig.14c
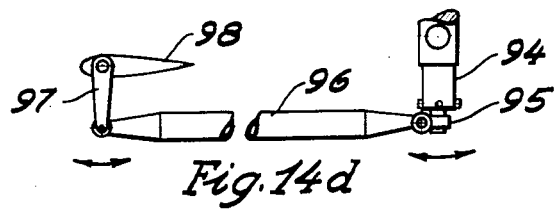
Fig.14d
INVENTOR.
JAQUES MULLER
BY
ATTORNEYS May 1, 1951 J. MULLER 2,550,850
VARIABLE INCIDENCE MULTIPLE WING SYSTEM FOR AIRCRAFT
Filed May 10, 1943 8 Sheets-Sheet 8

INVENTOR.
Jacques Muller
BY
Bohleber, Fassett Montstream
ATTORNEYS

Patented May 1, 1951

2,550,850

UNITED STATES PATENT OFFICE 2,550,850

VARIABLE INCIDENCE MULTIPLE WING SYSTEM FOR AIRCRAFT

Jaques Muller, Hagerstown, Md.

Application May 10, 1943, Serial No. 486,378

13 Claims. (Cl. 244—48)

The invention relates to an "aeroplane wing system," including the mechanism to operate same and the useful application of this wing system.

The object of the invention is to obtain:

First: A higher value of $K = C_{Lmax}/C_{Dmin}$ that is the ratio of the maximum lift coefficient to the minimum drag coefficient and thereby improve the performance of the aeroplane which is expressed characteristically by this ratio "K."

Second: A reduction of the wing area by preferably but not necessarily reducing the wing span and to utilize the advantages thereof in the design, construction, manufacture and in the use of aeroplanes.

The nature of the invention is aerodynamic in its principle and action, but it is mechanical in its design and construction.

The wing system comprises several elementary wings of preferably but not necessarily five or more than five elementary wings which have conventional airfoil cross section and which have conventional form in the plan view, and which are of the cantilever type without any brace, and which have no lift increasing devices of any kind attached, built in or otherwise incorporated, and which are mounted to the fuselage or hull so that they can be rotated with respect to the fuselage or hull and to each other about parallel spanwise axes which may be perpendicular to or inclined to the plane of symmetry, whereby the elementary wings can attain two limit positions called the position I for flight at high speed, and the position II for flight at low speed, and the elementary wings are arranged to each other with a certain predetermined stagger and gap which is reduced or increased to a certain predetermined size by rotating the elementary wings about said axes from the position I to the position II or vice versa by the means of a suitable mechanism permitting either to rotate the elementary wings simultaneously or successively single or in groups always starting with the elementary wing having the smallest angle of attack in the position II, that is the uppermost elementary wing, when the position II is to attain, and always starting with the elementary wing having the greatest angle of attack in the position II, that is the lowermost elementary wing, when the position I is to attain.

Figure 10 is a view in elevation of a sequential manual operating means for the wings.

Figure 11 is a partial side view and partially in section of the operating means of Figure 10.

Figures 12a and 12b show details of wing interconnections.

Figures 13a and 13b are plan and side views of a plane with its wings in flight position and an intermediate position is shown in dotted lines.

Figures 14a, 14b, 14c and 14d are respectively plan and side views of the pilot's control mechanism, a detail of the control and the connection with an elemental wing.

Figures 1, 3, 5:
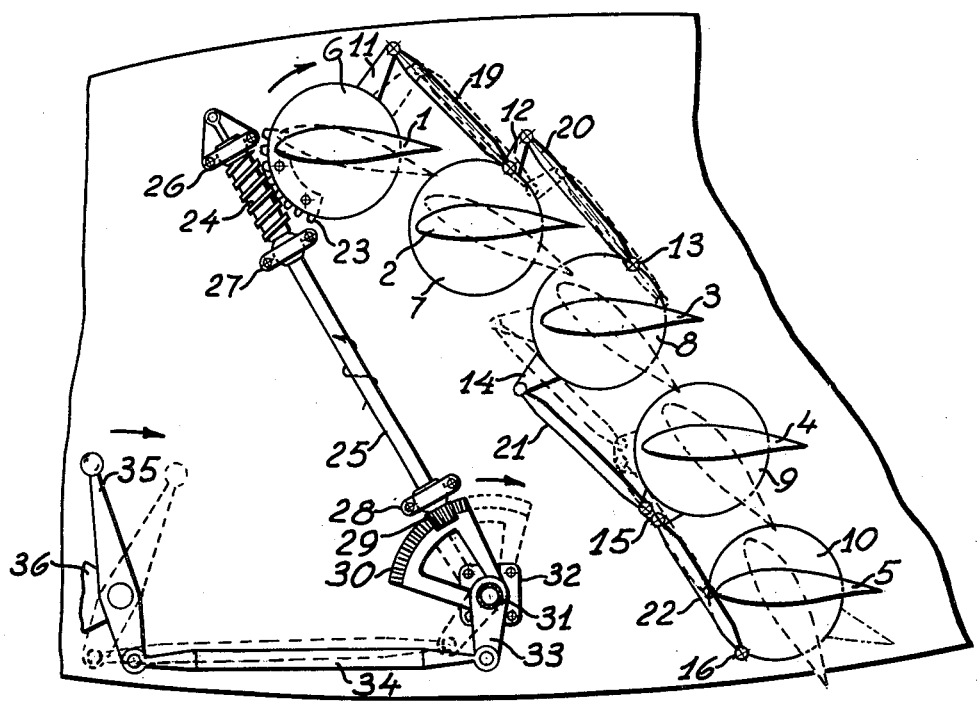
Figure 1 is a view in elevation of the wing system and the control mechanism.
Figure 3 is a cross section through a wing taken on line 3—3 of Figure 2.
Figure 5 shows an alternate gear connection between wings.
Figure 2:
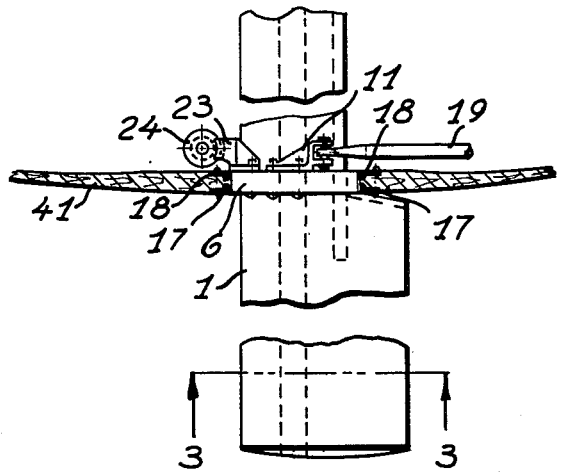
Figure 2 is a plan view of a part of an elemental wing and its mounting in the hull, the latter being in section.

Figure 1 is a side view of a wing installation in more or less diagrammatic form of drawing which was chosen for the sake of easy explanation. The wing consists here of five elementary wings with conventional airfoil cross section and with a plan view of rectangular shape as shown in Figure 2. The elementary wings are mounted rotatively to the fuselage or hull as well as with respect to each other about axes parallel to their span, and coinciding with the center of the circles drawn in heavy lines and which indicate the main bearings. The two limit positions which the elementary wings can attain, and which are the ones to be utilized, are the position for flight at high speed that is for example high speed level flight, as indicated by the airfoil sections in full lines, and the position for flight at low speed that is for take off, landing, ascending, and descending, etc., as indicated by the airfoil sections in dotted lines. The two positions are referred to in the following as position I and II respectively.

The turning of the elementary wings is attained by a suitable mechanism. One form of a mechanism for the simultaneous turning of the elementary wings is illustrated by Figure 1 and described below.

The elementary wings 1, 2, 3, 4, 5 are mounted in the main bearing plates 6, 7, 8, 9, 10 which bear in the female bearing housing 17, 18 shown in Figure 2. The lever arms 11, 12, 13, 14, 15, 16 are attached to the bearing plates 6, 7, 8, 9, 10. Adjacent lever arms are connected with each other by the rods 19, 20, 21, 22, for example the lever arms 14 and 15 are connected by the rod 21. The difference in the lengths of the lever arms 11, 12, 13, 14, 15, 16 provide that the elementary wings 1, 2, 3, 4, 5 will be turned about the respective angles necessary to attain the position I or II. To the bearing plate 6 also is mounted the worm gear 23 which gears with the worm 24 on the shaft 25. The latter bears in the bearings 26, 27, 28. Upon the other end of the shaft 25 there is mounted the bevel gear 29 which gears with the bevel gear 30, and this in turn is secured to the shaft 31. This shaft bears in the bearing 32. The lever arm 33 also is attached to the shaft 31 and is linked by the rod 34 with the lever 35 which is pivotally mounted in the bracket 36.

In operating the lever 35 by hand force, applied in the direction of the indicating arrow, the parts of the mechanism move to the position indicated by dotted lines which corresponds to the limit position II. The arrows near the parts 30 and 6, and the arrow on part 25 indicates the movement of these parts in order to ease the study of the movement of all parts of the mechanism.

When the elementary wings are in the position I, the wing system, acts as any wing of conventional design, that is, the lift coefficient and the drag coefficient substantially remain the same as that of the elementary wing, except that the coefficients may change slightly.

When the elementary wings are in the position II, the coefficients of lift and drag of the wing system, change considerably whereby the maximum lift coefficient increases to approximately three to three and one half times the maximum lift coefficient of the elementary wing, and the drag coefficient increases a corresponding amount.

The airflow is such that the slipstream of the preceding elementary wing passes over the succeeding elementary wings, and a part of the airstream passes through the reduced gaps between the wings at a higher velocity and this helps to maintain the laminar flow of air and prolongs the stalling effect. The result is that the elementary wings can attain a very high angle of attack without a break in the airstream and thereby obtain high values of lift coefficient. The increase in these two coefficients and the maintenance of the low drag coefficient at low values of the lift coefficient provide:

First: That the aeroplane with the wing system has a very steep flight pass angle in ascending and descending, without having the disadvantage of necessitating the great longitudinal inclination of the aeroplane.

Second: That the great increase in the lift coefficient makes possible a considerable reduction of the wing area without increasing the landing or take off speed and to increase the speed at level flight a very appreciable amount.

Third: That the greater speed in level flight obtainable, as shown above, also increases the range and the maximum flying time.

Fourth: That the reduction in the wing area, as explained, also permits a reduction in the wing span as well which fact gives the wing certain structural advantages.

Fifth: That the wing has a higher value of the ratio "K" due to the great increase in the lift coefficient and therefore has a higher ratio of the high speed at level flight to the landing speed which is one of the performance factors expressed by the ratio "K."

The invention relates to aeroplane wings from which it is known for some time that higher speeds of an aeroplane can be obtained by increasing the wing loading. Extensive use is made of this fact at the present time. A limit is set to the increase in the wing loading by the landing speed of the aeroplane which is dependent upon the maximum lift coefficient obtainable by the wing. In order to obtain higher lift coefficients, the wings of planes have been fitted with so called lift increasing devices such as auxiliary wings, slots, flaps, rotors built into the leading edge, continuously moving belts of the shape of the airfoil contour, and the like.

The best results have been obtained with wings having auxiliary wings with slots and flaps or either of them, but no further gain in the performance of wings has been made since these devices were introduced. The maximum lift coefficient, obtainable with wings having such lift increasing devices, is limited to $C_{Lmax}=1.8$ to 2.4 at the present time. Another disadvantage of the lift increasing devices is that, no matter how well the devices are designed and built to fit the contour of the wing, they do disrupt the smoothness of the wing surface and contour when retracted into the main wing body or when built into the wing and thereby add to the drag coefficient of the wing a considerable amount.

The great angle of attack necessary to maintain the flight with the lift increasing devices in action necessitates a great inclination of the lengthwise axis of the aeroplane. While this condition is permissible during flight, it is hazardous and dangerous when landing.

In order to overcome the limits, faults, and disadvantages of the wings fitted with lift increasing devices, the wing herein has been invented.

*Aerodynamic design and action*

The wing system comprises several elementary wings, preferably but not necessary there are five or more than five elementary wings, which have conventional airfoil cross section and which have conventional form in the plan view, and which are of the cantilever type without any brace, and which have no lift increasing devices of any kind attached, built in or otherwise incorporated. The elementary wings are also mounted to the fuselage or hull so that they are rotatable with respect to the fuselage or hull and to each other about parallel spanwise axes which may be perpendicular to or inclined to the plane of symmetry, whereby the elementary wings can attain two limit positions called the position I for flight at high speed, and the position II for flight at low speed. In addition the elementary wings are arranged to each other with a certain predetermined stagger and gap which is reduced or increased to a certain predetermined size by rotating the elementary wings about said axes from the position I to the position II or vice versa by means of a suitable mechanism which permits the elementary wings to be rotated either simultaneously or successively or in groups. For successive movement the elementary wing having the smallest angle of attack in the position II, that is the uppermost elementary wing, is first rotated when the position II is to be attained, and the elementary wing having the greatest angle of attack in the position II, that is the lowermost elementary wing, is first rotated when the position I is to be attained.

Figure 1 shows a wing in the side view in more or less diagrammatic form. The elementary wings 1, 2, 3, 4, 5 are shown in the two limit positions, whereby the position I is indicated by the airfoil sections drawn in full lines, while the position II is indicated by the airfoil sections drawn in dotted lines. The center of rotation of each elementary wing is the center of the circle about each airfoil section, and it is marked by the intersection of the vertical and horizontal dot-dash lines.

When the elementary wings are in the position I, they basically act as any conventional aeroplane wing, that is, the lift coefficient and the drag coefficient of the wing system, are substantially the same as the corresponding coefficients of the elementary wings, except that particularly the drag coefficient may increase slightly due to the mutual interference between the elementary wings, but it does not necessarily increase. Particular emphasis to this fact and proof thereof is given in the paragraph dealing with the comparison of the wing herein with a conventional monoplane wing. But it may be stated that the drag cofficient of the wing is lower than that of the monoplane wing having the same lift, if the number of the elementary wings is five or more than five. The wing has in the position I low values of drag coefficient at low values of lift coefficient.

The deviation of the slip stream (down wash) direction from the direction of the airstream ahead of each elementary wing is small at small and median angles of attack, and therefore the slip stream of the preceding elementary wing does not pass along the succeeding elementary wing or wings. But the slip stream of the preceding elementary wing will influence the pass of the airstream on the upper surface of the next succeeding elementary wing only at high angles of attack. This fact is very important for the distinction as to the flow of air around the elementary wings, when they are in the position II.

When the elementary wings are in the position II, their action is such as to produce a very high lift coefficient at an increased drag coefficient. The maximum lift coefficient can reach values as high as three to three and one half times the maximum lift coefficient of the elementary wing. The drag coefficient increases a corresponding amount. The great increase in the values of these coefficients enables the plane to ascend and descend at a very steep flight pass angle and it also enables the wing area to be reduced a considerable amount, as it will be shown hereinafter. The increase in the value of the lift coefficient is due to the fact that the succeeding elementary wing is now wholly or more or less partly within the slip stream of the preceding elementary wing, so that, if the angle of attack of the elementary wing with respect to the relative wind direction, that is the resultant direction of the slip stream and the airstream ahead of the wing, corresponds to the maximum angle of attack of the elementary wing, then the total angle of attack with respect to the direction of the airstream ahead of the wing is equal to the approximate sum of the maximum angle of attack of the elementary wing plus the angle of the slip stream direction with respect to the direction of the airstream ahead of the wing. But the increase in the angle of attack alone does not assure the greater value of the life coefficient, because the airstream will break off (stall) if the airstream is not made to adhere to the streamline contour of the elementary wings. This is provided by reducing the gap between the elementary wings to a certain predetermined size. The gap serves a twofold purpose.

First: It provides that a part of the oncoming airstream can pass through the gap more or less unhindered, and thus prevent a too great an increase in the drag coefficient.

Second: A part of the static pressure energy of the air flowing through the gap is converted within the gap into velocity energy, so that the airstream is leaving the gap with a greater velocity than that with which it has entered the gap. The low static pressure within this airstream makes the airstream, on the upper side of the preceding elementary wing flowing towards this region of lower static pressure, try to intrude into the airstream leaving the gap. This action of suction is so strong that the airstream of the preceding wing adheres to the wing contour without breaking off or stalling, and thereby assures the maintenance of the streamline flow of air at a very high angle of attack. The static pressure difference prevailing between the airstreams flowing along the upper surfaces of the elementary wings after having left the gaps and the airstream flowing along the lower surfaces of the elementary wings also contributes to the increase in the lift coefficient.

The slip stream of the elementary wing 1 does not influence alone the airstream passing along the upper surface of the next succeeding elementary wing 2, but it flows along the upper surfaces of all succeeding elementary wings, that is the wings 2, 3, 4, 5 and since the slip stream is originated by the airstream entering the leading edge of the elementary wing 1, there is a continuous airstream flowing from the leading edge of the elementary wing 1 along all succeeding elementary wings 2, 3, 4, 5, and the airstream leaves the wing at the trailing edge of the lowermost elementary wing, here wing 5.

This condition of the flow of air along the wing, when the elementary wings are in the position II, is distinct systematically from the flow of air around the elementary wings, when same are in the position I.

Therefore the wing is not merely a simple multiplane nor it is merely an improvement of a multiplane, but it is a wing system with an entirely new aerodynamic characteristic produced by the action of a new mechanism.

The wing provides besides the advantages explained above a number of additional advantages the most important of which are summarized below.

First: There is possibility to increase the aspect ratio by dividing the total wing area into several elementary wings and therewith reducing the induced drag. The aspect ratio is increased despite the fact that the wing span is reduced. This fact is given emphasis in the paragraph dealing with the comparison of the wing with that of a monoplane. The reduction in the span and the subdivision of the wing area also gives certain dynamic and structural advantages particularly the relative increase in the stiffness of the elementary wing.

Second: The use of several elementary wings provides a smaller wing chord, and due to this it is structurally much easier to secure the exact contour and shape of wing profile desired and this contour and shape also will be maintained in flight under load. Furthermore, this provides that the surface will be very smooth not only due to the finish supplied to the surface, but due more to the fact that the irregularities of the surface are reduced to a practical possible minimum or are eliminated entirely by the possibility of employing a thicker skin construction without necessarily increasing the wing weight per unit area. The conclusion from this fact is that the profile drag coefficient and moreover the surface drag coefficient are reduced to the minimum obtainable.

Third: The aerodynamic action of the wing provides an increase in the maximum lift coefficient without the use of any lift increasing devices. Also no control surfaces are attached to the wing system so that all irregularities are eliminated such as occur along the contour, shape, and surface at the connection lines between the main wing body and the lift increasing devices or control surfaces. How it is possible to dispense from the wing system the lateral control surfaces such as the ailerons, is explained in the paragraph about the application of the wing.

Fourth: The small chord of the elementary wings and their short span provide that the undesirable differences in the spanwise lift distribution which occur during flight in a curve, at autorotation, at spins, sideslips etc. are numerically much smaller than the corresponding values in a conventional wing design, and therefore also their influence on the general aerodynamic characteristic in these flight conditions is small. This is an advantage to be emphasized.

There is one unfavorable and undesirable condition which exists when the elementary wings are being turned from the position I to the position II and vice versa, because the elementary wings have not the aerodynamic action in the intermediate relative position as have the elementary wings in the position II. Therefore, the elementary wings will tend to stall in the intermediate positions. To overcome this unsatisfactory condition it is necessary to move the elementary wings from one to the other position faster than the stall on the wings can develop. This method is used in the case wherein all elementary wings are turned simultaneously. Though, this method works, it has the disadvantage of increasing the airforce too suddenly and therewith imposing a jerk on the aeroplane.

A better method is to turn the elementary wings successively one by one or in groups always starting with the elementary wing having the smallest angle of attack in position II, that is the uppermost elementary wing, when the position II is to be attained and always starting with the elementary wing having the greatest angle of attack in the position II, that is the lowermost elementary wing, when the position I is to be attained. This method provides that the slip stream of the preceding elementary wing strongly influences the flow of air on the upper surface of the succeeding elementary wing in a stall prolonging way, and the stalling of the flow of air rather is eliminated than merely overcome. Another advantage of this method is that the change in the airforce is slower and more uniform and thus prevents the sudden jerk. Also, the force necessary to operate the mechanism for turning of the elementary wings is reduced to $1/n$, wherein "$n$" is the number of the elementary wings.

The aerodynamic design of the wing is very complex, because it is dependent upon a variety of parameters which in themselves are complex values. Therefore, the most important parameters are discussed separately in the following.

*Airfoil section.*—Basically every airfoil section is suitable as profiles for the elementary wings, but preferably are those having a fixed center of pressure and a trailing edge to provide an airflow more or less tangent to the upper surface of the succeeding elementary wing when the elementary wings are in the position II. The airfoil section may be kept constant in spanwise direction with or without a geometric twist of the elementary wing, or the airfoil section may vary in spanwise direction with or without an additional geometric twist of the elementary wing for the purpose of obtaining a certain spanwise lift distribution. All elementary wings may be made equally for the purpose of cheaper manufacture, but the length of the chord of the elementary wings may vary with the elementary wing, if the optimum of the aerodynamic performances are to be obtained. Preferably the chord of the elementary wings having the lower numbers are shorter than the chords of the elementary wings having the higher numbers. The number of the elementary wing is counted starting with the uppermost elementary wing as number 1. If the elementary wings are made of unequal airfoil sections, it is preferably but not absolutely necessary to vary the airfoil section so as to provide that the camber of the airfoil sections employed on successive elementary wings varies in an inverse ratio to the radius of curvature of the curve on which the centers of rotation of the elementary wings are located.

*Axis of rotation.*—The airfoil section of the elementary wing preferably but not necessarily shall be located so as to reduce to a minimum the moment of the resultant airforce of the elementary wing with respect to the axis of rotation. In case airfoil sections are used not having a fixed center of pressure, the elementary wings preferably but not necessarily may be located so as to provide that the said moments partly or wholly counteract each other and thus reduce or eliminate them. This latter case has particular importance, when the elementary wings are turned simultaneously.

*Plan form.*—The plan form of the elementary wings is made preferably but not necessarily of rectangular shape with a more or less rounded wing tip, but if it is desired to obtain a certain spanwise lift distribution, then the plan form may be made tapered employing a straight line or curved line taper. In this case the gap between the elementary wings will vary spanwise when the elementary wings are in the position II, and attention has to be paid to the variation of the gap. It is best to make the span of all elementary wings equal, if the reduction in the span shall be utilized fully. But if it is desired to reduce the induced drag as well as the interference drag, then the spans are preferably varied, whereby it does not matter which of the elementary wing or wings has or have the longer span.

*Dihedral.*—In order to simplify the manufacture of the elementary wings, it is best not to employ any dihedral. But if it is desired to give the elementary wings dihedral for the purpose of increasing the lateral stability, then it is necessary to observe that the gap between adjacent elementary wings, when these are in the position II, varies spanwise, if the axis of rotation of the elementary wings remains perpendicular to the plane of symmetry, and the same or similar effect is produced as is in the case of a tapered plane form.

*Stagger.*—The stagger is determined by the gap between adjacent elementary wings in their two limit positions and by the maximum angle of attack of the elementary wings. A third parameter is that the succeeding elementary wing has to be located within the slip stream of the preceding elementary wing. In order to obtain favorable design values, it is desirous to locate the center of rotation of the elementary wings on a curve, which in one extreme case may be a straight line. Those curves serve best which are obtained by cuts through a straight line cone or a curved line cone, because of the mathematical and systematic relationship with these curves provide.

*Gap.*—The gap between adjacent elementary wings is given partly by the stagger, but for the purpose of having a method on hand which provides good design values, the following formula in combination with the method of iteration is recommended.

$$G_{II} = \frac{G_I}{n}$$

wherein:

$G_I$ and $G_{II}$=gap in positions I and II respectively
$n$=number of elementary wings.

The gap $G_I$ shall be made as big as possible.

*Number of elementary wings.*—The number of the elementary wings determines the maximum lift coefficient of the wing. The following formula gives a satisfactory base for the choice of the number of elementary wings.

$$n = \pi/\cotang \, \alpha_s$$

wherein:

$n$=number of elementary wings
$\pi$=3.14 circular constant
$\alpha_s$=slip stream angle of the wing in the position II.

The slip stream angle has a wide range and may vary from 20 to 90 degrees. The usual range for good practical values is about 55 to 75 degrees.

*Maximum lift coefficient.*—To accurately determine the maximum lift coefficient of the wing is very difficult until enough windtunnel tests are available. The maximum lift coefficient obtainable may be determined by the following formula for the purpose of the practical design. But attention is drawn to the fact that the maximum lift coefficient also is a function of the gap, stagger, number of the elementary wings, and the airfoil sections employed.

$$C_{L\,max\,P} = \frac{dC_L}{d\alpha}\left[\alpha_E + X(\alpha_s - \alpha_E)\right]$$

wherein:

$C_{L\,max\,P}$=maximum lift coefficient of the wing.

$\frac{dC_L}{d\alpha}$=slope of the curve of the lift coefficient in function of the angle of attack for the airfoil section of the elementary wings.

$\alpha_E$=angle of attack at maximum lift for the airfoil section of the elementary wing.

$\alpha_s$=maximum slip stream angle of the wing.

$X = \frac{2 \times \alpha_s}{\pi \times 57.3}$=factor of slip stream effect.

Structural design and construction

The wing installation used in the following description and explanation is intended for a small cabin type aeroplane. This aeroplane is chosen as first test aeroplane, because it gives the advantage of having good commercial prospects at the same time. But the construction and use of the wing is not limited to this type of aeroplane only. The particular wing installation illustrated is of the plywood construction. This was chosen, because it permits a less expensive and easier manufacture besides the advantage of permitting a greater wall thickness due to the favorable stress-weight ratio of the plywood and thus contributing to the smoothness of the elementary wing surfaces. But the wing may be made in any of the other types of construction such as metal-construction as well.

Figure 1 illustrates the side view of this wing installation in a more or less diagrammatic form. The wing consists here of five elementary wings. The mechanism shown in this figure is for the simultaneous turning of the elementary wings. The elementary wings 1, 2, 3, 4, 5 are mounted to the main bearing plates 6, 7, 8, 9, 10 which bear in the bearing housing 17, 18 shown in Figure 2. The lever arms 11, 12, 13, 14, 15, 16 are attached to the bearing plates 6, 7, 8, 9, 10. Adjacent lever arms are connected with each other by the rods 19, 20, 21, 22, so that in example the lever arms 14 and 15 are connected by the rod 21. The differences in the length of the lever arms 11, 12, 13, 14, 15, 16 provide that the elementary wings 1, 2, 3, 4, 5 can be turned about the various angles necessary to attain the position I or II. To the bearing plate 6 also is mounted the worm gear 23 which gears with the worm 24 on the shaft 25. The latter bears in the bearings 26, 27, 28 which are bolted to the side wall of the fuselage or hull. On the other end of the shaft 25 is mounted the bevel gear 29 which gears into the bevel gear 30, and this in turn is secured to the shaft 31. This shaft bears in the bearing 32 which is secured to the fuselage structure. The lever arm 33 also is attached to the shaft 31 and is linked by the rod 34 to the lever 35 which pivots on the bracket 36. This bracket is secured to the fuselage structure.

In operating the lever 35 by hand force applied in the direction of the indicating arrow, the parts of the mechanism move into the position indicated by dotted lines which correspond to the limit position II, while the parts in full lines indicate the limit position I. The arrows near the parts 30 and 6 and the arrow on part 25 indicate the movement of these parts in order to simplify the study of the movement of all parts of the mechanism. All parts of the mechanism except the parts 36, 35, 34, 33 and 31 are arranged in pairs, so that there are two separate mechanisms one right hand and one left hand mechanism whereby each is mounted along the side wall on either side of the fuselage. The right hand and the left hand mechanisms are connected with each other by the torqueshaft 31. The connecting rods are made best of tubular cross section with swaged rod ends to which the self aligning ball bearing heads, as such are in use at the present time, are attached by means of rivets or in any other suitable way. The heads of the rods are mounted to the levers or brackets by means of a bolt, nut, and cotterpin. The levers or brackets are constructed as forks for the purpose of clamping the heads of the rods between the prongs of said fork. Figure 2 illustrates the top view of the left hand side installation of the elementary wing 1, whereby the side wall of the fuselage is shown in cross sectional cut. The arrangement of the few parts shown is so simple that no further explanation is necessary. The only fact to be pointed out is that the mechanism is arranged on the inside of the fuselage and therewith does not add to the drag. The plan form of the elementary wing is here rectangular with a very slightly rounded wing tip. The wing structure as such is constructed as one piece with the main spar running from wing tip to wing tip, while the auxiliary spar extends only through the middle part of the elementary wing. The spars are indicated by dotted lines. The trailing edge of the part of the elementary wing located between the bearing plates is cut off to the auxiliary spar, because it is unnecessary in this region. A cross section of the elementary wing is shown in Figure 3. The heavy skin construction eliminates the ribs, and only a few form holding bulkheads in intervals of three to four times the wing chord are necessary in the trailing edge portion. The shell type construction of the wings is necessary in order that the elementary wings can carry the high unit wing-loading imposed to them due to the great reduction in the wing area.

Figure 12 illustrates the construction of an elementary wing whereby the elementary wing consists of two wing panels, one right hand and one left hand wing panel. Figure 12a shows the left hand wing panel installation viewed towards the leading edge, and Figure 12b illustrates the same installation viewed from the top. For simplicity of explanation the elementary wing 1 is used as an example of this construction. The main bearing plate 6 is secured to the wing panel 1 as previously described, and to the root end of the wing panel is mounted the pin type bracket 89 which here is secured to the panel by the rivets 88. The pin of the bracket 89 bears in the self-aligning bearing 90 which is secured by the bolts 91 to the special structure 92 located in the plane of symmetry of the fuselage. Said structure is constructed here as a plate. If it is desired to provide an opening between the spaces of the fuselage located ahead and aft of the wing system for the purpose of communication or the like, then the special structure may basically be made of two parallel walls, whereby the gap between them is provided wide enough that men can pass through. The division of the elementary wings into two halves as described has the advantage of easier assembling and also makes unnecessary the cut outs in the fuselage for passing therethrough the elementary wings as well as the equatorial division of the bearing rings 17, 18 and 19 shown in Figure 4. While this construction can be employed in general, it has to be used in case the axes of rotation of the elementary wings is parallel to the semi span axes of the elementary wings when same have dihedral.

Some of these advantages can be gained by constructing the elementary wings in three parts, one center part to which the main bearing plates are secured and two outer wing panels one right hand and one left hand panel which are attached to the center part at the main bearing plates. The attachment is of the type as used to attach the outer wing panels to the center wing panel in conventional designs.

In all three types of construction of the elementary wings as described above, it is not necessary that the cross section of the part of the elementary wings which is within the fuselage structure have any relationship to the airfoil section of the outer panel of the elementary wing so that said part can be constructed to meet the requirement of strength best. Therefore, said part preferably is constructed as a shell construction reinforced by stringers, whereby the cross section of the shell preferably is of rectangular, square, circular, or elliptic shape.

Figure 4:
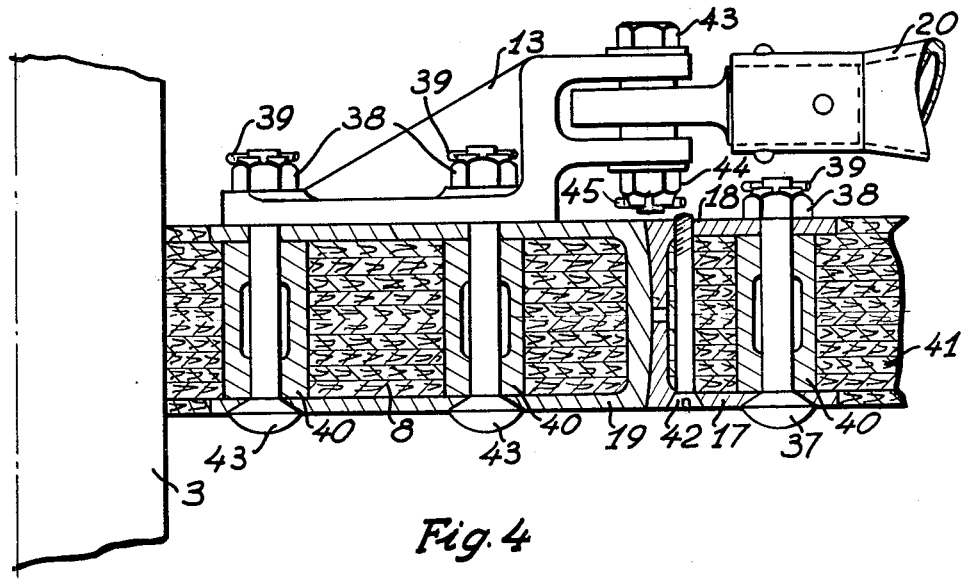
Figure 4 is a cross section through the hull mounting of a wing and a partial view of a connection between wings.

Figure 4 illustrates the cross sectional cut through the main bearing plate of the elementary wing 3. The bearing plate 8 is glued to the elementary wing 3 and is constructed of plywood. The bearing surface part 19 is made U-shaped in cross section and it is equatorially divided in order to provide assembling. The part 19 and the bracket 13 are secured to the bearing plate 8 by means of the bolts 43, nuts 38, cotter pins 39, and spacers 40. The circumferential surface on part 19 is preferably but not necessarily made spherically with the center of rotation of the bearing plate as center of the sphere. The part 19 bears in the parts 17 and 18 which together form the housing of the main bearing. These two parts also are divided equatorially for assembling. Parts 17 and 18 are secured to the fuselage side wall 41 by the parts 37, 38, 39, and 40 of which several are arranged circumferentially. Several screws 42 are installed for the purpose of taking out the slack of the bearing by tightening them. A rod end installation also is shown. The rod 20 is bolted to the bracket 13 by the parts 43, 44, and 45. The other bearings, brackets etc. are constructed similarly and therefore their illustration and description is omitted.

In case the elementary wings are constrcted as one piece as shown in Figure 1 and as described above, then it is necessary for the purpose of assembling to provide openings in the fuselage side wall in order to pass through the trailing edge of the elementary wings. In Figure 1 is indicated in dotted lines such opening for the elementary wing 5. The opening here has a wedge type shape and it is closed after the assembling by a wedge glued into said opening. It is advantageous to locate the division line of the bearing housing 17 and 18 so that said division line is offset from the opening. This will provide an additional reinforcement for the fuselage side wall.

Instead of connecting the elementary wings with each other by means of rods and lever arms, they can be connected by the use of a gear train, as it is illustrated in Figure 5. The gear segments 46 and 47 are bolted to or are otherwise connected with the main bearing plates and the gear with the intermediate idler gear 48, which rotates about the shaft 49, which is secured to a bracket on the side wall of the fuselage. Said bracket is not shown in this sketch. The two adjacent elementary wings shown are in the position I, and the arrows indicate the movement of the gears in order that the elementary wings attain the position II. The remaining part of the mechanism that are the items 23 to 36 and their arrangement is the same as in the mechanism illustrated in Figure 1 and described above. The employment of the worm gear drive gives the advantage that the elementary wings are locked at any instant during the turning operation as well as in the positions I and II. The worm gear is arranged best in connection with the elementary wing which has to turn the smallest angle. This is the uppermost elementary wing.

Figure 6:
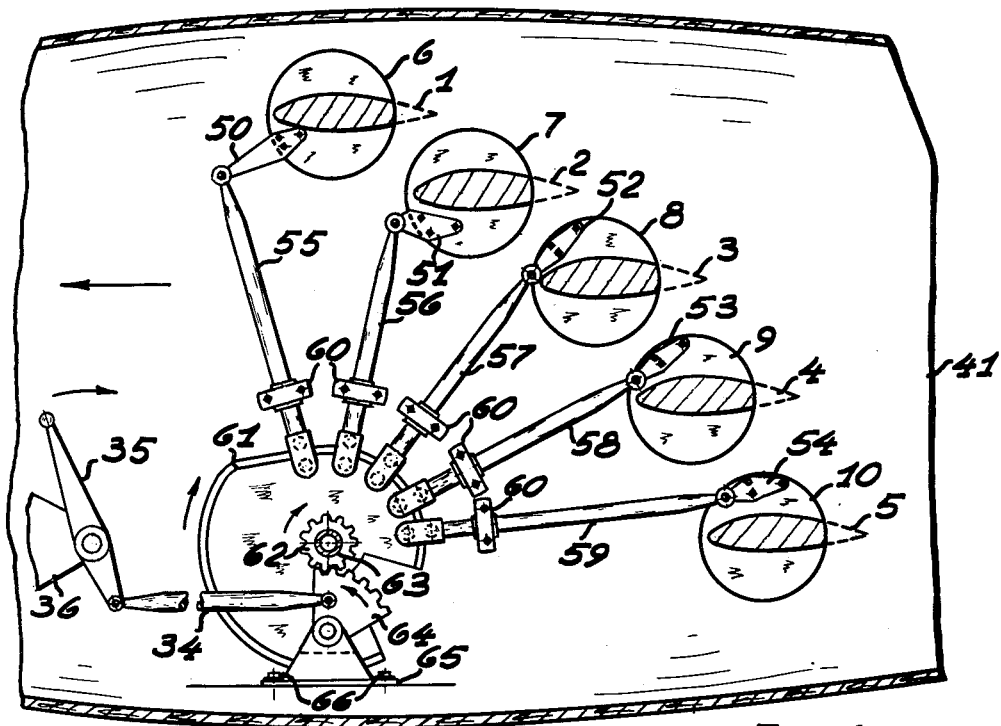
Figure 6 is a view in elevation of another form of operating means for the wings.
Figure 7:
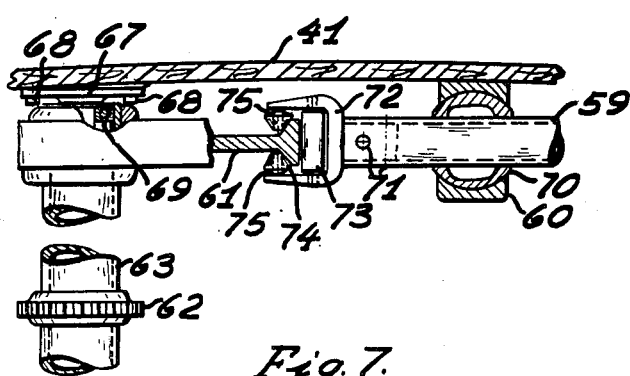
Figure 7 is a plan view partially in section of the operating means.

Figure 6 illustrates the side view of a wing installation with a mechanism for the successive turning of the elementary wings. The bearing plates 6, 7, 8, 9, 10 of the elementary wings 1, 2, 3, 4, 5 are attached to the brackets 50, 51, 52, 53, 54 to which are linked the rods 55, 56, 57, 58, 59 so that they are arranged approximately radially to the more or less centrally located cam 61 into which the rods engage. The rods 55 to 59 are guided by the self aligning bearings 60 which are located near to the cam 61 and they are secured to the fuselage side wall. The cam 61 is mounted on the shaft 63 on which also is mounted the gear 62, and this meshes with the gear segment 64 which is mounted rotatively to the bracket 65, and this in turn is secured to the fuselage structure by bolts 66. Linked with the part 64 is the rod 34 at one end, while the other end of the rod is linked to one end of the lever 35 pivoting about the bracket 36 which is mounted to the fuselage structure. The other end of the lever 35 carries a knob on which the hand force is applied to operate the mechanism. The elementary wings and the mechanism are shown in the position I. In order to turn the elementary wings into the position II. it is necessary to move the lever 35 in the direction of the indicating arrows. The gears 64 and 62 including the cam 61 move as indicated by the respective arrows; and the cam 61 pushes the rods successively away from the center of the cam and thus turn the bearing plates 6, 7, 8, 9, 10 with their elementary wings one after the other starting with the elementary wing 1. If the elementary wings are turned from the position II to the position I, then the cam pulls the rods towards its center of rotation and the cam, gears, as well as the other parts of the mechanism move in the opposite direction as indicated by the arrows. The elementary wings are turned successively now starting with the elementary wing 5. The connection of the cam and the rod is illustrated by Figure 7. Mounted to the side wall of the fuselage is the bearing 60 with its self-aligning part 70 in which bears the rod 59. The parts 60 and 70 are shown in cross section. Attached to the end of the rod 59 is the fork 72 by means of the two rivets 71. Mounted rotatively to the fork 72 is the cylindrical roller 73 which rolls along the outer surface of the cam 61, and the two conical rollers 74 which roll along the inner surface of the cam 61. For the purpose of having an automatic adjustment, the plate springs 75 are installed between the fork 72 and the conical rollers 74 so that these are pushed away from the fork and thus take out the slack between the rollers and the cam. The cam 61 is shown partly in cross section. The pin type bracket 67 also is mounted to the fuselage side wall 41 by the bolts 68, and the shaft 63 to which are mounted the cam 61 and the gear 62 rotates about said pin 67. The self-aligning ball bearing 69 serves this purpose. If it is desirous for manufacturing purpose to have many equal parts, then the rods 55 to 59 and the brackets 50 to 54 can be made alike, whereby the brackets 50 to 54 have to be mounted differently with respect to the main bearing plates 6 to 10 in order to take care of the difference in the length of the lever necessary to turn the elementary wings to their proper position with the constant stroke of the cam 61. There are other forms of the cam possible, as the T-type shown, but this is the best mode for this purpose. The circumferential shape of the cam is made up of two circular arcs of different radii which are connected by a suitable curve forming the actual cam. The center of said two arcs coincides with the center of rotation of the cam. All parts of the mechanism except the parts 34, 35, 36, 61, 62, 63, 64, 65 are arranged in pairs symmetrically with respect to the plane of symmetry of the wing system, so that there is a right hand and a left hand mechanism which are connected by the shaft 63. The right hand and left hand mechanisms are mounted inside of the fuselage along the side walls.

The mechanisms as described above and as illustrated are designed for hand operation. If it is necessary to increase the operating force, then a pedal operated by foot may be linked to the hand lever 35 and serve as an auxiliary source of power. But both mechanisms can be operated fully by power for which the hyraulic piston-cylinder motor is preferable. In this case it is best to link the cylinder to a bracket which is mounted rigidly to the fuselage structure, and to link the piston to the lever 33 of Figure 1 or to the gear segment 64 of Figure 6. The hydraulic motor is actuated by a power driven pump and it is controlled and directed by a four way valve. Those hydraulic units are on the market at the present time, and therefore no detail explanation is necessary.

Figure 8:
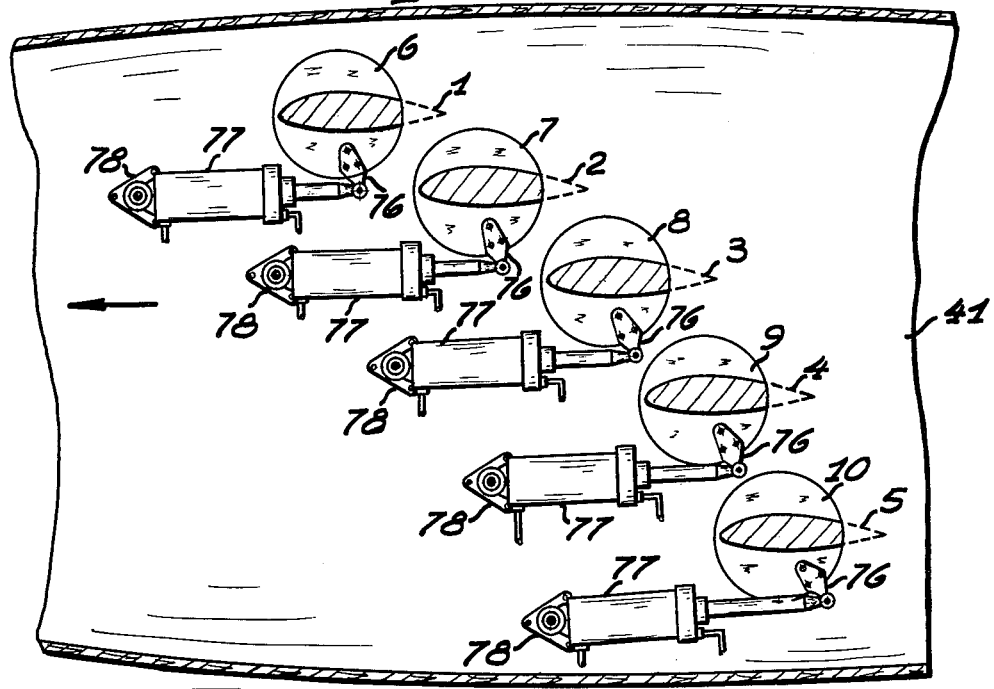
Figure 8 is an elevational view of an hydraulic form of operating means for the wings.

Figure 8 illustrates the side view of a wing with a fully power driven hydraulic mechanism for the successive turning of the elementary wings as well as for the simultaneous turning of the elementary wings. The brackets 76 are of the same type as the bracket 13 shown in Figure 4 and they are bolted to the main bearing plates 6, 7, 8, 9, 10 of the elementary wings 1, 2, 3, 4, 5 as is the bracket 13. Linked to the brackets 76 are the pistons of the hydraulic motors 77, while their cylinders are linked to the pin type brackets 78 which are bolted to the fuselage sidewalls or are mounted to them in any other suitable way. The various brackets 76 and 78 and the various hydraulic motors 77 are made alike in this particular case for the purpose of inexpensive manufacture, but not necessarily have to be made alike. if the minimum of weight is to be attained. Here the cylinders of the hydraulic motors are provided with suitable stops for the purpose of limiting the stroke of the piston to the proper length. This can be accomplished for example by inserting a sleeve into the cylinder so that the piston rests against the sleeve when the piston is in the limit position. The mechanism is arranged in pairs for each elementary wing, so that there is a right hand and a left hand mechanism one of which is installed on the inside of the fuselage along each of its side walls. The cylinders are fed by a power driven pump. The movement of the pistons is controlled and regulated by four way valves whereby for the successive turning of the elementary wings it is necessary to operate each pair of the hydraulic motors, that is, one right hand and one left hand motor belonging to the same elementary wing, by one four way valve, and so that the elementary wings can be turned successively or simultaneously depending upon the mechanical coupling of the valves.

Figure 10 shows the mechanical arrangement for the successive switching of the valves as it is necessary for the successive turning of the elementary wings by operating one handle only and at the same time doing this operation in a foolproof way.

The housing 81 contains the cock-type valves of known construction. The valves are arranged in the housing, so that the center lines of the shafts of the valves are located on the periphery of a circle about the center of which is arranged rotatively the lock gear 83, to which the handle 80 is attached, here done by the screws 87. The end of the handle carries the knob 79 by which the handle is operated by hand. The Malteser gears 86 are attached to the shafts 85 of the valve cocks, here done by means of the setscrews 84. The handle 80 carries the pin 82 which in this case is secured to same by riveting the pin to the handle. The pin engages into the slots of the Malteser gears 86 and turns them from one to the other position. The gear 86 partly covered by the handle 80 is being turned, while the one to the very right already has been turned to the opposite position of the remaining valves. This arrangement also provides that the valves always are locked, besides having the advantage, that the valves only can be switched in the one desired consecutive manner. The Malteser gear arrangement is shown partly in side view in the Figure 11 for the purpose of clarification. This figure is self-explanatory so that a further description is omitted.

Figures 15, 16:
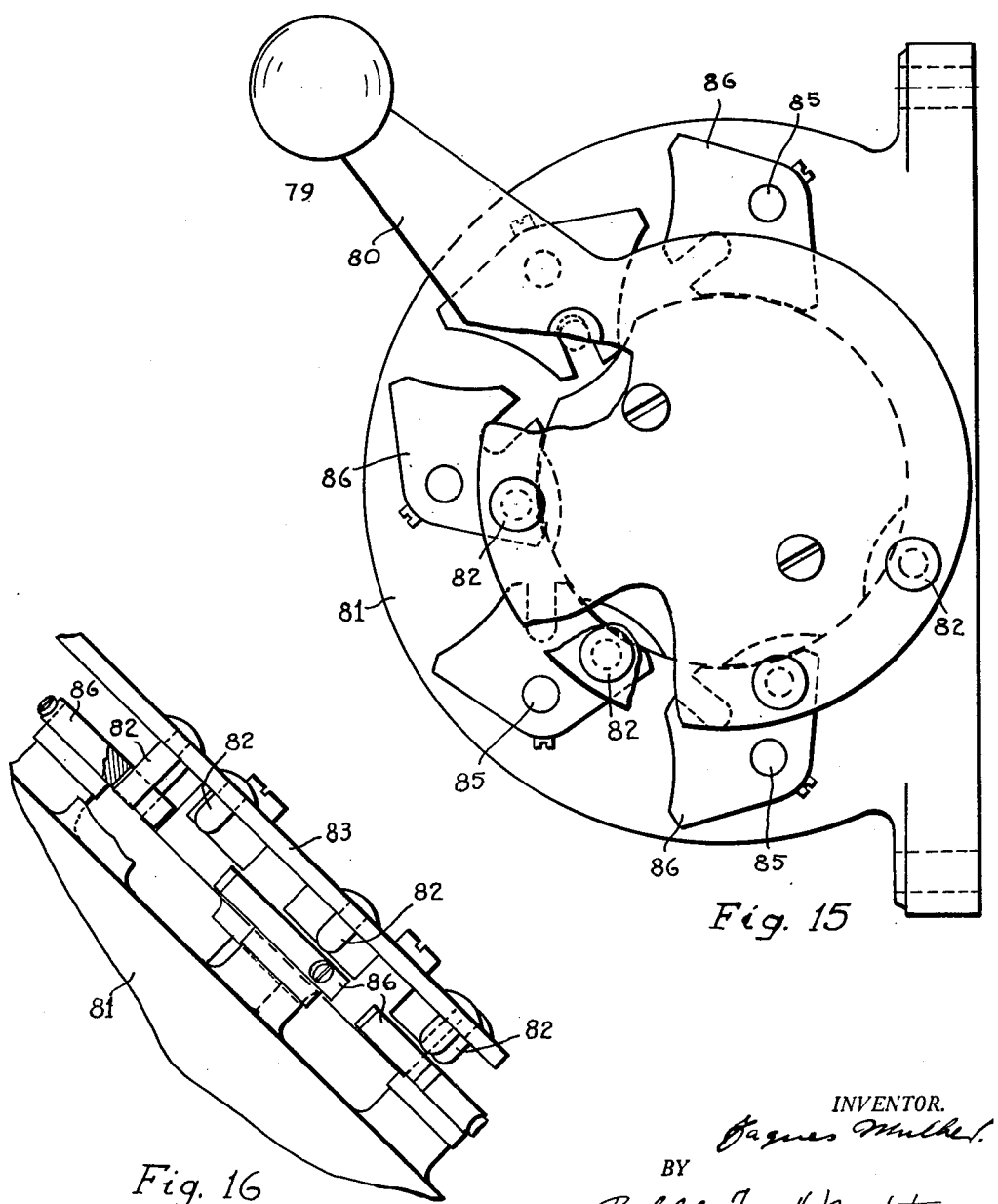

The gear as shown in Figures 15 and 16 can be made adaptable for the simultaneous turning of the elementary wings, if the lower part of the handle 80 is made preferably circular and big enough in order to provide the attachment of as many pins 82 as there are valves to turn, here five pins 82, then all valves are turned simultaneously by turning the handle. But, if it is desired to turn the elementary wings simultaneously only, then only one four way valve is necessary, whereby all the hydraulic motors are connected in parallel.

Figure 9:
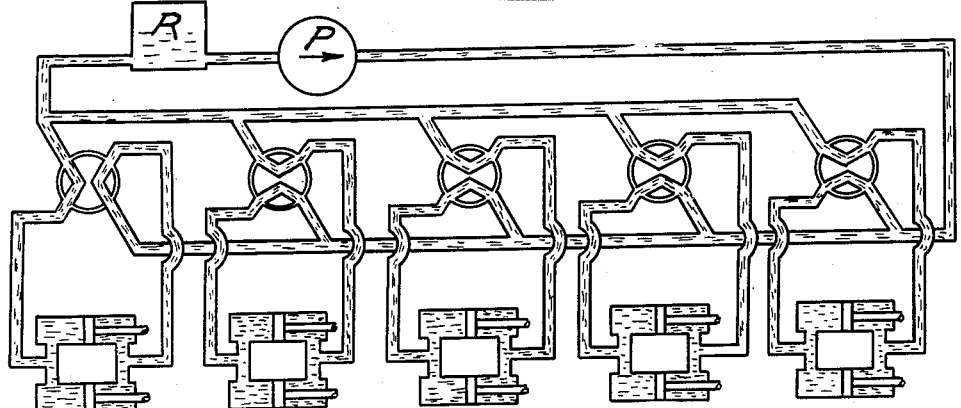
Figure 9 is a schematic diagram of the hydraulic system.

Figure 9 illustrates the hydraulic pipe plan of the hydraulic system as shown in Figure 8 in case the elementary wings are turned successively. The valve on the very left is shown in the opposite position from that of the other valves, and thus the direction of the flow of fluid can be studied more easily for both positions.

There are a number of other mechanisms possible, but they seem to be disadvantageous in some respect as compared to the mechanisms shown and described here.

The wing can be used as well in the conventional type of aeroplane in which the vertical and horizontal control surfaces are arranged in the rear or in the front of the aeroplane. The application of the wing in an aeroplane of the Duck-type is illustrated in Figures 13a and 13b. The aeroplane shown is a small cabin plane with a pusher type airscrew and a tricycle landing gear. Note particularly that the wing has no ailerons or other kind of control devices attached to it for the lateral control of the aeroplane nor have the elementary wings dihedral. Instead, the horizontal control surfaces have a greater dihedral than they would have in an aeroplane of conventional design, and the movable parts of the horizontal control surface, that is the elevators 98 in the Figure 13b are arranged to be used as elevators and ailerons. This is possible aerodynamically because of the relative great span and area of the horizontal control surface in comparison to the span and area of the wing. The mechanism for the actuation of the wing is not shown here, but it may be any of the mechanisms already described.

The control system for the actuation of the combined elevators and ailerons is illustrated by Figures 14a, 14b, 14c, 14d. Figure 14d shows the connection between the steering column and the elevators viewed from the side. The rod 96 is linked at one end to the elevator horn 97 of the elevator which pivots about its hinge line. The other end of the rod 96 is linked to the lever 95 on the steering column 94 which pivots about the bearing of the bracket 36 shown in Figure 14b in the side view. If the steering column is moved in the directions of the double arrow as indicated in Figure 14d, then the elevators move as shown by the respective double arrow. That is, that both elevators make the same up or down movement. In Figure 14c is shown the lever 95 with the two rods 96 for the right hand elevator and the left hand elevator in the view from the bottom. If the lever 95 is turned as indicated by the double arrow, then the elevators act as ailerons that is, one elevator turns downwardly, while the other turns upwardly and vice versa. The lever 95 may be made offset as shown, if a differential action in the aileron movement is desired. The lever 95 is mounted to a shaft inside of the column 94 and it is driven by the handwheel by means of a bevel gear drive. The hand lever 35 for the operation of the wing mechanism, i. e. the one shown in Figure 6 is arranged for pivoting about the same axis as is the steering column 94, and the lever 35 engages in its limit positions into notches or grooves provided for on the segment 93 shown in Figures 14a and b. Said segment is secured to the bracket 36. The rod 34 corresponds to that of Figure 6. The bending stiffness of the hand lever 35 in lateral direction is made rather small compared with the one in the direction perpendicular to it, so that the lever itself acts as a spring and thus eliminates any special mechanism for the locking of the lever.

The aerodynamic advantages of the wing as already explained in detail above, is substantiated best by the following comparison of the most important performance data of a conventional type monoplane wing having lift increasing devices with the corresponding data of the wing.

In order to have an equal base for the purpose of comparison, it is assumed with justified reason that the maximum lift coefficient of the wing is twice that of the monoplane, and that the airfoil sections of the elementary wings are the same as that of the monoplane. It may be mentioned here that median values of the maximum lift coefficients are 2.2 for the monoplane wing and 4.4 for the wing herein, but much higher values can be obtained with the latter.

Comparing the landing speeds by using the equations for the lift at maximum lift coefficients and by dividing both equations, there is obtained:

$$\frac{V_P}{V_M} = \sqrt{\frac{C_{L\ max\ M} \times A_M}{C_{L\ max\ P} \times A_P}} \quad (1)$$

wherein the indicators P and M refer to the wing herein and monoplane respectively. $V$=speed, $C_{Lmax}$=maximum lift coefficient, $A$=area of the wings. The ratio of the speeds must be unity for equal landing speeds, but this only can be attained, if the nominator and the denominator under the root are equal, from which follows that if $C_{LmaxP}=2 \times C_{LmaxM}$, then it has to be $A_P=\frac{1}{2} \times A_M$, which means that the wing area of my wing only needs to be 50% of the wing area of the monoplane in this particular example, and this reduction suitably is attained by reducing the wing span about 50%.

Comparing the equations for high speed level flight by dividing same, there is obtained $$\frac{V_P}{V_M} = \sqrt[3]{\frac{A_M \times C_{DM}}{A_P \times C_{DP}}} \quad (2)$$

It is then on the basis of equal lift coefficients using the ratio of the wing areas as obtained above.

$$\frac{V_P}{V_M} = \sqrt[3]{2} = 1.25$$

This of course means that the speed which can be obtained with the wing herein is 25% greater than the speed of the monoplane.

It was tacitly assumed in this calculation that the drag coefficients are equal in both cases which does not hold true, and therefore the values of the drag coefficients are compared below.

It is in general $C_D = C_{D\text{induced}} + C_{D\text{profile}}$. This equation becomes for the monoplane $$C_{DM} = \frac{C_{LM}^2 \times A_M}{\pi \times b_M^2} + C_{D\text{profile}}$$

and for my wing with consideration of the mutual interference drag between the elementary wings and with the values of the ratio of the spans and areas as above $$C_{DP} = \frac{C_{LP}^2 \times A_M}{\pi \times b_M^2}\left[\frac{2}{n} + (n-1)\frac{4}{n^2} \times \sigma\right] + C_{D\text{profile}}$$

The interference factor $\sigma$ has in the extreme actual case the value of 0.9 which is a high value chosen to the disadvantage of the wing herein, so that the value of the term in parenthesis, becomes 0.975 or approximately 1.00 for the number of elementary wings $n=5$. This means that the drag coefficients of the monoplane and of the wing herein are equal, if 5 elementary wings are employed in the wing. Or in other words the total drag coefficient of my wing becomes smaller than that for the monoplane wing on the basis of equal lift coefficients, if the wing consists of 5 or more than 5 elementary wings, or what is the same, the Polar-curves of the monoplane and of my wing are the same, if the latter consists of 5 elementary wings.

Therewith it is proved that the wing herein has a higher ratio "K," that is the ratio of the maximum lift coefficient to the minimum drag coefficient, than have best monoplane wings at the present time, and this was one of the objects of the invention.

The increase in the speed is not quite as great, if the comparison is based on equal lift instead of equal lift coefficients. This is due to the fact that the wing herein has to fly at a higher lift coefficient than the monoplane wing. A higher value of the drag coefficient belongs mostly but not necessarily to a higher lift coefficient, but the increase in the first is at a smaller progression than the increase in the lift coefficient. Since no equation is available to express the Polar-curve of an airfoil section, it is necessary to use the actual Polar-curve in this comparison. The following equation is obtained by resolving the Equation 1 for the ratio of the lift coefficient.

$$\frac{C_{LP}}{C_{LM}} = \frac{V_M^2 \times A_M}{V_P^2 \times A_P} \quad (3)$$

The amount of increase in the speed of the wing herein is obtained by using chosen values of $V_P/V_M$ in the Equation 3 and by calculating $C_{LP}$ for given values of $C_{LM}$ and $A_M/A_P$. Then is obtained for $C_{LP}$, thus computed, the corresponding value of $C_{DP}$ from the Polar-curve, and $V_P/V_M$ is calculated from Equation 2. A curve plotted from the values of ($V_P/V_M$ chosen) in function of ($V_P/V_M$ calculated) will reveal a sharp bend at the point for which both values are equal. This value of $V_P/V_M$ is the final value.

For the sake of giving a numerical value, this calculation was carried out by using the following values: $A_M/A_P=2$, $C_{LM}=0.2$, and the Polar-curve for the well known airfoil section Clark-Y.

The following values were found by this calculation: $C_{DP}/C_{DM}=1.33$ so that $$V_P/V_M = \sqrt[3]{\frac{2}{1.33}} = 1.14$$

This means, that the speed obtained with the wing herein is 14% in excess of the speed obtained with the monoplane on the basis of equal lift.

It may be emphasized that these values are already very appreciable, but they merely construe median values and not the optimum values obtainable by the wing herein.

I claim:

1. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved towards or away from the trailing edge of the preceding elemental wing, means for each elemental wing to pivot the same, and a single operating means engaging the next aforesaid means successively corresponding to the position of the elemental wings thereby compelling operation in predetermined sequence to spaced position and reverse sequence to adjacent position, the operating means locking the means for pivoting each elemental wing in each adjusted position.

2. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means selectively operable to rotate each elemental wing successively or simultaneously including means for each wing to pivot the same, and a single operating means operating the next aforesaid means successively corresponding to the position of the elemental wings thereby compelling operation in predetermined sequence to spaced position and reverse sequence to adjacent position and also operating the next aforesaid means simultaneously, the operating means locking the wings in adjusted position.

3. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means to rotate each elemental wing successively including cam means having a single camming incline, and a connection from the cam means to each elemental wing, each connection being positioned relatively to the cam means so that each connection is operated successively by the camming incline corresponding to the position of the elemental wings thereby compelling operation in predetermined sequence to spaced position and reverse sequence to adjacent position, the cam means locking the connection in adjusted position.

4. An aeroplane wing construction comprising a plurality of elemental wings of airfoil section including a first elemental wing and succeeding elemental wings, each succeeding elemental wing being positioned below and to the rear of its preceding elemental wing, means mounting at least one elemental wing for pivotal movement, each pivotal elemental wing being positioned so that upon pivotal movement its leading edge is moved adjacent to the trailing edge of the preceding elemental wing, and means to rotate each pivotal elemental wing including operating means, a rotatable cam means operated by the operating means and having a single camming incline, and a radial connection from the cam means to at least one elemental wing whereby pivotal motion from the operating means is transmitted to the pivotal elemental wings but motion and force developed at the wing is prevented from being transmitted to the operating means, each connection being positioned relatively to the cam means so that each connection and wing is operated in predetermined succession by the camming incline corresponding to the position of the elemental wings thereby compelling operation in predetermined sequence to spaced position and reverse sequence to adjacent position, the cam means locking the connection in adjusted position.

5. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means to rotate each elemental wing successively including gear means for each elemental wing, a connection from each gear means to an elemental wing, an operating means to rotate the gear means, and each gear means being positioned circumferentially relatively to the operating means so that each gear means and connection is operated successively corresponding to the position of the elemental wings thereby compelling operation in predetermined sequence to spaced position and reverse sequence to adjacent position, and the gear means locking the connection in adjusted position.

6. An aeroplane wing construction comprising a pluarlity of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means to rotate each elemental wing successively including Geneva gear means for each elemental wing, a connection from the gear means to each elemental wing, a pivotally mounted handle carrying a Geneva gear operating means, and each gear means being positioned successively around the handle pivot so that each Geneva gear means and connection is operated successively corresponding to the position of the elemental wings thereby compelling operation in predetermined sequence to spaced position and reverse sequence to adjacent position, and the gear means locking the connection in adjusted position.

7. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means to rotate each elemental wing successively including Geneva gear means having a single tooth for each elemental wing, a connection from each Geneva gear means to each elemental wing, a pivotally mounted handle carrying a pin to engage the Geneva gear means and a disc, and each Geneva gear means being positioned circumferentially relatively to the disc so that each gear means, connection and elemental wing is operated successively corresponding to the position of the wing thereby compelling operation in predetermined sequence to spaced position and reverse sequence to adjacent position and the Geneva gear means is locked in its two positions by the disc.

8. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means operable to rotate each elemental wing successively including a motor for each elemental wing, power means for the motors, control means for each motor, and means to operate the control means successively corresponding to the position of the elemental wings thereby compelling operation in predetermined sequence to spaced position and reverse sequence to adjacent position, and the gear means locking the connection in adjusted position.

9. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means selectively operable to rotate each elemental wing successively or simultaneously including an hydraulic motor for each elemental wing, hydraulic pressure means for the motors, valve means for each motor, a Geneva gear means for each valve means to operate the same, and operating means to turn each Geneva gear means successively or simultaneously.

10. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means selectively operable to rotate each elemental wing successively or simultaneously including an hydraulic motor for each elemental wing, hydraulic pressure means for the motors, valve means for each motor, and means to operate the valves, a Geneva gear means having a single tooth for each valve means, a pivotally mounted handle carrying a pin to engage each Genea gear means and a disc, and each Geneva gear means being positioned circumferentially relatively to the disc so that each gear means is operated successively and is locked in its two positions by the disc.

11. An aeroplane wing construction comprising a plurality of elemental wings of airfoil section including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved adjacent to the trailing edge of the preceding elemental wing, and means selectively operable to rotate each elemental wing successively or simultaneously including an hydraulic motor for each elemental wing, hydraulic pressure means for the motors, valve means connecting the pressure means with the motor means, and means to operate the valve means for successively or simultaneous movement of the elemental wings.

12. An aeroplane wing construction comprising a fuselage, a plurality of elemental wings of airfoil section and short span including a first elemental wing and succeeding elemental wings, each succeeding elemental wing being positioned below and to the rear of its preceding elemental wing, means mounting each elemental wing for pivotal movement, each elemental wing being positioned so that upon pivotal movement its leading edge is moved towards and away from the trailing edge of the preceding elemental wing, means to rotate each elemental wing, aeroplane control means carried by the fuselage spaced from the elemental wings, ailerons carried by the control means, and means to control the ailerons and the control means.

13. An aeroplane wing construction comprising a plurality of elemental wings of airfoil section including a first elemental wing and succeeding elemental wings, each succeeding elemental wing being positioned below and to the rear of its preceding elemental wing, means mounting at least one elemental wing for pivotal movement, each pivotal elemental wing being positioned so that upon pivotal movement its leading edge is moved adjacent to the trailing edge of the preceding elemental wing, and means to rotate each pivotal elemental wing successively including operating means, cam means operated by the operating means, a connection from the cam means to at least one elemental wing and extending perpendicularly relatively to the cam means whereby pivotal motion from the operating means is transmitted to the pivotal elemental wings but motion and force developed at the wing is prevented from being transmitted to the operating means, and the connection being located relatively to the cam means so that the connections for the elemental wings are operated successively and hence the wings are operated successively.

JAQUES MULLER.

REFERENCES CITED

The following references are of record in the file of this patent:

UNITED STATES PATENTS

| Number | Name | Date |
| --- | --- | --- |
| 1,433,030 | Page | Oct. 24, 1922 |
| 1,443,100 | Stout | Jan. 23, 1923 |
| 1,600,834 | Mader | Sept. 21, 1926 |
| 1,831,139 | Roberts | Nov. 10, 1931 |
| 2,003,206 | Lewis | May 28, 1935 |
| 2,183,279 | McCarty et al. | Dec. 12, 1939 |
| 2,289,704 | Grant | July 14, 1942 |
| 2,348,252 | Griswold | May 9, 1944 |